United States Patent
Lee (10) Patent No.: US 6,449,364 B2
(45) Date of Patent: Sep. 10, 2002

(54) PROGRAMMABLE HANDS FREE TELEPHONE SYSTEM

(75) Inventor: Way-Shing Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 26 days.

(21) Appl. No.: 09/766,776

(22) Filed: Jan. 22, 2001

Related U.S. Application Data (63) Continuation of application No. 09/146,322, filed on Sep. 2, 1998, now Pat. No. 6,208,733.

(51) Int. Cl.$^7$ ............................................... H04M 1/100
(52) U.S. Cl. ................................................. 379/420.04
(58) Field of Search ........................... 379/420.04, 446, 379/447, 454, 455; 485/90, 575, 569

(56) References Cited

U.S. PATENT DOCUMENTS

| | | | |
|---|---|---|---|
| 5,528,667 A | 6/1996 | Steffensen et al. | 455/462 |
| 5,822,427 A | 10/1998 | Breitberg et al. | 379/446 |
| 6,208,733 B1 * | 3/2001 | Lee | 379/420.04 |

FOREIGN PATENT DOCUMENTS

| | | |
|---|---|---|
| EP | 0518274 | 12/1992 |
| WO | 9727697 | 7/1997 |
| WO | 9823041 | 5/1998 |

* cited by examiner

Primary Examiner—Jack Chiang
(74) Attorney, Agent, or Firm—Philip R. Wadsworth; Kent D. BAker; Sandra L. Godsey (57) ABSTRACT

A hands free telephone system includes a telephone having audio circuits for processing an audio signal and a telephone audio connector for transmitting the audio signal between the audio circuits and the telephone audio connector. A telephone holder has a holder program for instructing the telephone holder to perform telephone functions in accordance with the stored program. A method for programming a telephone that includes transmitting a plurality of programming instructions between the programming device and the telephone holder, each programming instruction corresponding to a memory location within the holder memory, determining whether the transmitted programming instructions correspond to adjacent memory locations within the telephone holder, and determining an error condition in accordance with determination of whether the transmitted programming instructions correspond to adjacent memory locations.

5 Claims, 7 Drawing Sheets

PROGRAMMABLE HANDS FREE TELEPHONE SYSTEM

CROSSREFERENCE

This application is a continuation of U.S. application Ser. No. 09/146,322, filed on Sep. 2, 1998, now U.S. Pat. No. 6,208,733, entitled "Programmable Hands Free Telephone System."

BACKGROUND OF THE INVENTION

I. Field of the Invention

The present invention is generally related to communications. More particularly the present invention relates to a system and method for programming a hands free telephone system.

II. Description of the Related Art

Hands free telephone systems do not require a user to pick up and hold the handset when the user is using the telephone. Thus hands free telephone systems do not restrict the freedom of the user and leave the hands of the user free to perform other functions at the same time. Because of this benefit, these telephones are becoming increasingly popular for use in offices and in cars as mobile telephones.

It is known for hands free telephone equipment to include separate, small sized, detachable and transferable equipment located outside the telephone. Hands free equipment often does not use the internal microphone of the telephone in order to avoid modification of the software within the telephone. It is well known for hands free equipment to contain only a microphone, an amplifier and a loudspeaker along with the amplifier for the loudspeaker outside the telephone. It is also known for hands free equipment to perform telephone functions such as compensating for background noise and recharging the batteries of mobile telephones.

Hands free equipment can also include advanced functions. For example it can perform the operations necessary for making or finishing a call such as off hook, dialing and on hook using voice recognition technology. However, the performance of these functions is subject to high cost, high power consumption and complicated formalities. Accordingly, it is customary for hands free telephone users to use a keypad on the telephone to enable off hook, dialing and on hook by touching the particular keys.

It is also known for hands free telephone equipment to include a controller within the hands free telephone equipment for controlling certain telephone operations of the telephone. The controller can include a controller data processor having a memory for storing data and command input, thereby permitting command data to be applied to the controller data processor and permitting the controller to control telephone operations. Hands free telephone equipment of this type can also include a data communication link for transferring data between the controller data processor and a programming data processor external to the hands free equipment. This permits data stored in the memory of the programming data processor to be copied to the controller memory. It is also known to use wireless communications for transmitting the data between the programming data processor and the controller processor. However, this greatly increases the cost of the equipment.

SUMMARY OF THE INVENTION

A hands free telephone system includes a telephone having audio circuits for processing an audio signal and a telephone audio connector for transmitting the audio signal between the audio circuits and the telephone audio connector. A telephone holder has a holder program for instructing the telephone holder to perform telephone functions in accordance with the program. The telephone holder has a holder audio connector for mechanically mating with the telephone audio connector and transmitting the audio signal between the telephone audio connector and the programmable holder. A programming device includes circuitry for storing and transmitting the holder program and the programming device has a programming connector for mechanically mating with the holder audio connector and transmitting the holder program between the programming device and the telephone holder by way of the mated programming connector and the holder audio connector, whereby the holder audio connector is adapted to transmit both the audio signal and the holder program. The telephone audio connector can be disposed upon the telephone holder.

A hands free telephone system includes a telephone having audio circuits, a telephone audio connector, a telephone holder having a stored holder program for instructing the telephone holder, a holder audio connector, and a programming device having a programming connector. Program information is transmitted between the telephone holder and the programming device. Audio signals are processed by the audio circuits within the telephone and transmitted between the audio circuits and the telephone audio connector. The telephone audio connector and the holder device connector are mated and the audio signals are transmitted between the telephone audio connector and the telephone holder. The holder audio connector and the programming connector are mated and program information is transmitted between the programming device and the telephone holder by way of the mated holder audio connector and the programming connector whereby both the audio signal and the program information are transmitted by way of the holder audio connector.

In a hands free telephone system having a telephone, a telephone holder for performing telephone operations in accordance with a program in a holder memory within the telephone holder and a programming device for transmitting the program to the telephone holder, the holder memory is locked to prevent alteration of the holder memory while the holder memory is locked. Programming information is transmitted from the programming device to the telephone holder and a determination is made whether the transmitted programming information includes unlocking information for permitting alteration of the holder memory. The holder memory is altered in accordance with the transmitted programming information depending upon the determination. The holder memory can be relocked after the altering.

In a hands free telephone system having a telephone, a telephone holder for performing telephone operations in accordance with a program in a holder memory within the telephone holder and a programming device for transmitting the program to the telephone holder, a plurality of programming instructions is transmitted between the programming device and the telephone holder, each programming instruction corresponding to a memory location within the holder memory. A determination is made whether the transmitted programming instructions correspond to adjacent memory locations within the telephone holder and an error condition is determined accordingly.

BRIEF DESCRIPTION OF THE DRAWINGS

The features, objects, and advantages of the present invention will become more apparent form the detailed description set forth below when taken in conjunction with the drawings in which like reference characters identify corresponding elements throughout and wherein.

DETAILED DESCRIPTION OF THE INVENTION

Figure 1:
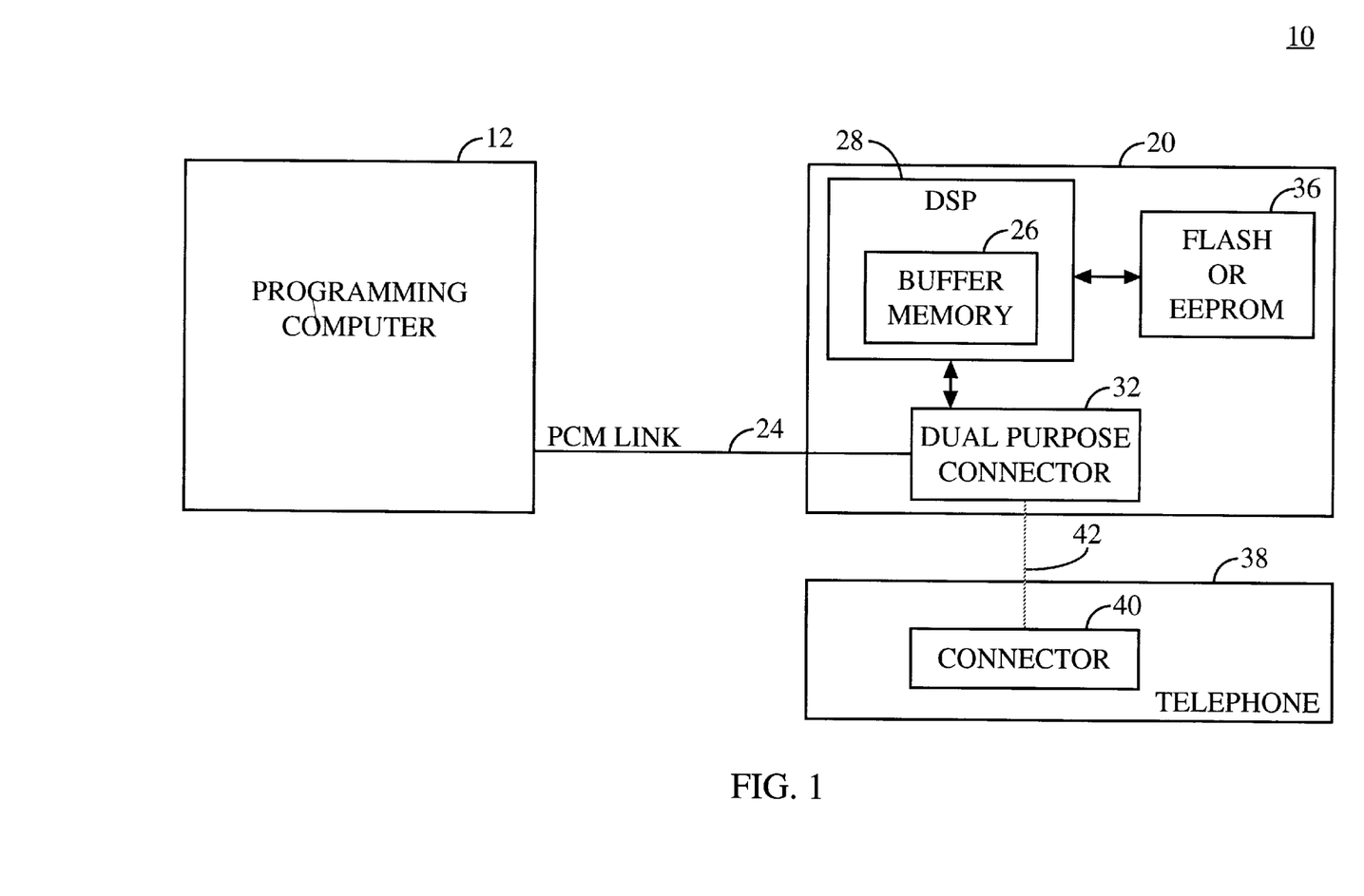
FIG. 1 is a block diagram representation of the hands free telephone system of the present invention.

Referring now to FIG. 1, there is shown programmable hands free telephone system 10 of the present invention. Programmable hands free telephone system 10 includes hands free equipment 20 which is a telephone holder having dual purpose connector 32 for receiving and electrically coupling to mobile telephone 38 in order to permit hands free use of mobile telephone 38. Hands free equipment 20 is programmable and can be programmed to perform a plurality of telephone functions in cooperation with mobile telephone 38 when coupled to it. When mobile telephone 38 is received by hands free equipment 20 it is both electrically and mechanically coupled to hands free equipment 20 by telephone connector 40 and dual purpose connector 32. Thus audio signals representative of speech during a telephone conversation made using mobile telephone 38 are transmitted between hands free equipment 20 and mobile telephone 38 by way of communication path 42 dual purpose connector 32.

Figure 8:
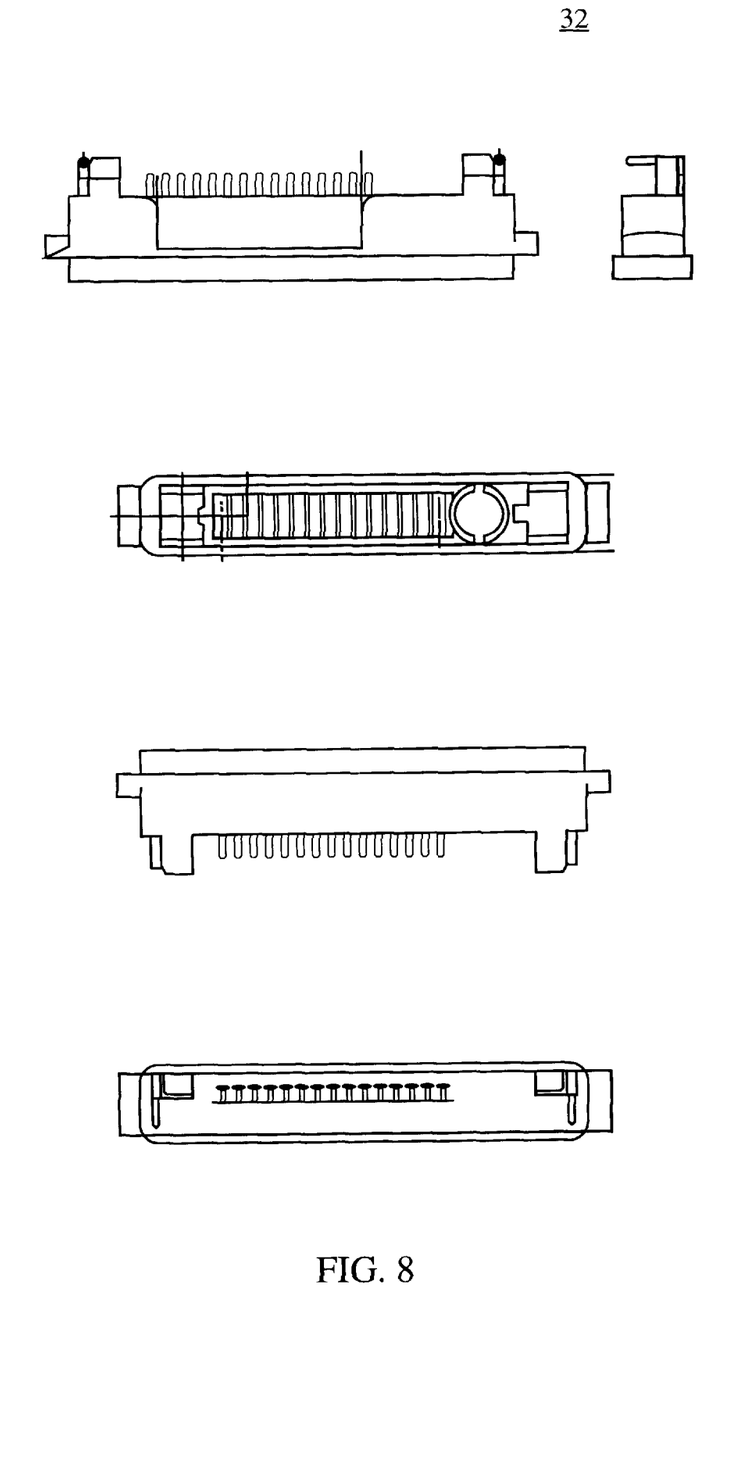
FIG. 8 is a representation of an example of a connector suitable for use with the present invention.

Programmable hands free telephone system 10 also includes programming computer 12. Using programming computer 12 a user of hands free telephone system 10 can program and reprogram hands free equipment 20. In order to program or reprogram hands free equipment 20 programming computer 12 communicates with hands free equipment 20 by way of a pulse code modulated (PCM) link such as PCM link 24 and dual purpose connector 32. FIG. 8 shows an example of a type of connector that can provide the functions of dual purpose connector 32. Dual purpose connector 32 both electrically and mechanically couples PCM link 24 and hands free equipment 20. The data received by way of PCM link 24 and dual purpose connector 32 can be applied by digital signal processor (DSP) 28 by way of buffer memory 26 and, therefrom, to DSP external memory 36 for the purpose of providing operating instructions to DSP 28. DSP external memory 36 can be flash memory, for example an EPROM. The transfer of data into buffer memory 26 is performed one constant sized page at a time. The transfer of data form buffer memory 26 can occur a segment at a time wherein the segment size can vary.

Using PCM link 24 and dual purpose connector 32 during a PCM sample period a user of hands free telephone system 10 can perform several operations. These operations include transmitting data from programming computer 12 to hands free equipment 20, receiving data by programming computer 12 from hands free equipment 20, erasing a sector of DSP memory within hands free equipment 20 by programming computer 12, reading the ID of a memory device within hands free equipment 20 by programming computer 12, and reporting the check sum of transmitted blocks of data by hands free equipment 20 to programming computer 12. Thus PCM link 24 carrying programming information for hands free equipment 20 couples to hands free equipment 20 at the same location used for coupling mobile telephone 38 to hands free equipment 20, dual purpose connector 32.

Figure 2A:
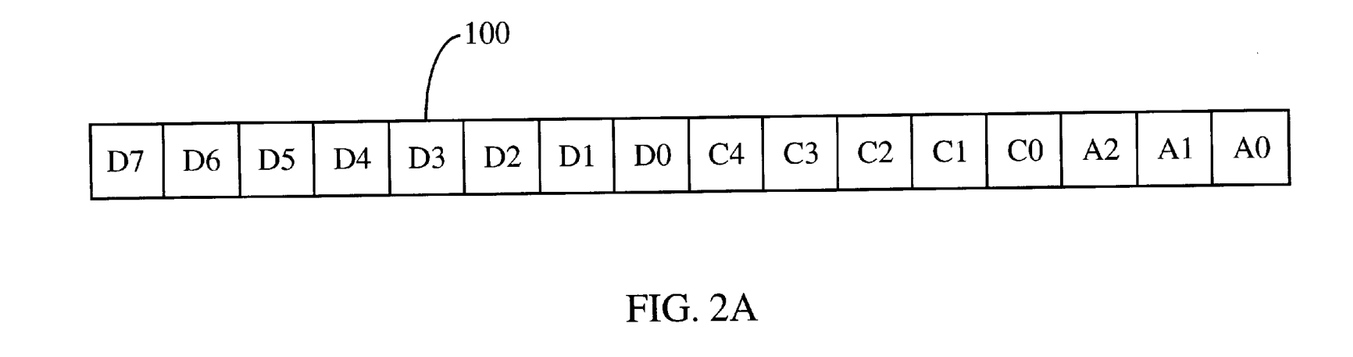
FIGS. 2A, 2B represent data formats useful in the communication link of the telephone system of FIG. 1.

Referring now to FIG. 2A, there is shown forward link data format 100. The forward link communication from programming computer 12 to DSP 28 by way of PCM link 24 using forward link data format 100 is asynchronous and a periodic. During forward link communication programming computer 12 controls the communication speed on the forward link. For each PCM sample period any number of bits can be transmitted in the forward link PCM stream. In a preferred embodiment of hands free telephone system 10 sixteen bits are transmitted during a PCM sample period. In the embodiment wherein sixteen bits are transmitted during a sample period, eight bits (e.g. D0–D7) of the PCM stream can be allocated as the data segment of the transmission. Three bits (e.g. A0–A2) can be allocated as the address segment. Five bits can be reserved as the command segment.

Figure 2B:
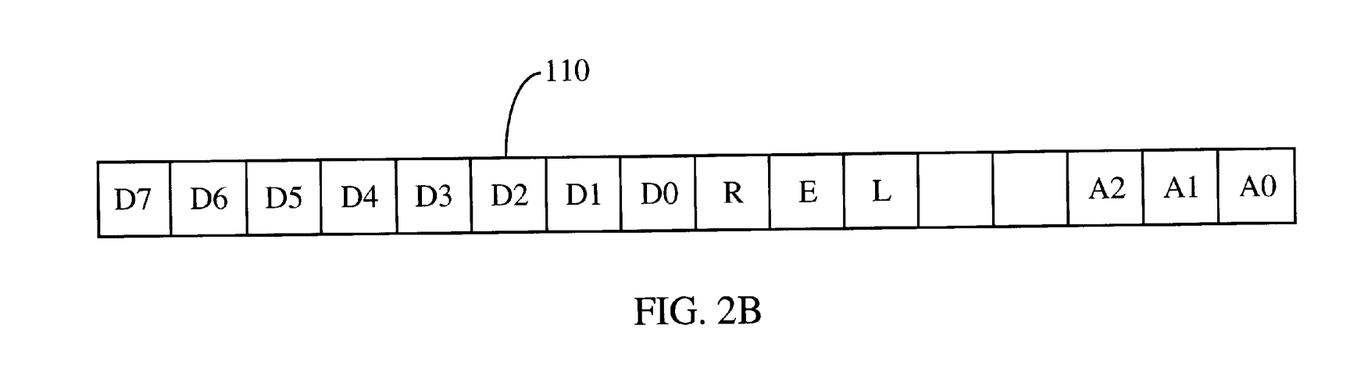

Referring now to FIG. 2B, there is shown reverse link data format 110. Reverse link communication from DSP 28 to programming computer 12 is performed using reverse link data format 110. The reverse link communication speed from DSP 28 to programming computer 12 by way of PCM link 24 in hands free telephone system 10 is controlled by programming computer 12. Hands free equipment 20 sends data to computer 12 only when requested by the user of computer 12. When such a request is not made the reverse link is idle. As in forward link communications any number of bits can be transmitted in a reverse sample period of the reverse link PCM stream. When sixteen bits are transmitted during a sample period of the reverse link PCM stream, eight bits can be allocated as the data segment. Three bits of the reverse link stream are allocated as the address segment of the reverse link sample period. Bit 7 can be allocated as the ready/busy flag. Bit 6 can be allocated as the error/success flag. Bit 5 can be is allocated as the lock/unlock flag.

DSP 28 can operate in a plurality of modes including differing normal-operating modes collectively referred to as a handset mode, and a maintenance mode. In the handset mode of hands free telephone system 10, a communication path 42 is established by way of dual-purpose connector 32 between DSP 28 and mobile telephone 38. DSP 28 can then provide voice service for hands free conversation and voice recognition through dual-purpose connector 32. In the maintenance mode of hands free telephone system 10 data can be read from or written to hands free equipment 20 by programming computer 12 via PCM link 24.

In order to place DSP 28 into the maintenance mode, mode transition commands are transmitted to DSP 28 by the user of programming computer 12 using PCM link 24 and dual purpose connector 32. The commands for putting DSP 28 into the maintenance mode are defined within hands free telephone system 10 only when DSP 28 is in the idle mode. The procedure for putting DSP 28 into the maintenance mode is as follows: DSP 28 is put into the protocol mode, the Go To Idle command is transmitted, the software version number (SVN) inquiry command is sent in order to determine the current software version within hands free equipment 20, the Go To Maintenance 1 command is transmitted twice; the Go to Maintenance 2 command is transmitted twice. If the commands received by hands free equipment 20 do not follow this sequence, transition to the maintenance mode is prevented in order to protect DSP memory 36 within hands free equipment from being erroneously altered, for example due to a random link error.

DSP memory 36 can be divided into several segments, wherein the segments within DSP memory 36 can have different sizes. For example, one commercially available memory suitable for use as DSP memory 36 has five segments. The first segment of this memory has sixteen kilobytes. The second and third segments each have eight kilobytes. The third and fourth segments have thirty-two kilobytes and sixty-four kilobytes respectively.

The downloader code within the DSP 28 maintains temporary buffer memory 26. Temporary buffer memory 26 temporarily holds the data transmitted between DSP memory 36 and programming computer 12. Temporary buffer memory 26 can be any convenient size. For example, temporary buffer memory 26 can contain sixteen kilobytes. Temporary buffer memory 26 can be filled using a command that instructs DSP 28 to read from DSP memory 36 with a specified page number. It can also be filled by the user of hands free telephone system 10 using the download command.

Data stored within temporary buffer memory 26 can be returned to programming computer 12 in order to determine whether it is correct. If the returned contents of temporary buffer 26 are determined to be correct programming computer 12 issues a command to erase the corresponding locations of DSP memory 36 and a command to program DSP memory 36 with the contents of temporary buffer 26. The user of hands free telephone system 10 repeats this procedure until all the required pages of DSP memory 36 are updated.

DSP indicates to programming computer 12 that it is ready to receive a command by setting a ready/busy flag in the reverse link. After the command is received by DSP 28, DSP 28 clears the ready/busy flag and takes a variable amount of time to perform the operations indicated by the received command depending on the complexity of the requested operations. Programming computer 12 clears the command by sending a NOP command and waiting until the READY flag is set by DSP 28 before issuing another command.

After a command is executed, DSP 28 determines whether any errors have occurred during execution and provides an error/success report to programming computer 12 using the E flag. If there are any errors during any part of the execution of the received command the E flag is set to one. Otherwise, the E flag is set to zero in order to report a success to the programming computer 12.

In order to protect DSP memory 36 from erroneous commands, for example, due to an error in PCM link 24, certain commands from programming computer 12 must be preceded by an Unlock command in order to access DSP memory 36. These commands include the commands to erase a sector of DSP memory 36 and to program a page of DSP memory 36. Before an Unlock command is transmitted by programming computer 12, the lock/unlock flag L is set to one to indicate that DSP 28 will not accept any memory access commands. When the Unlock Memory command is transmitted, DSP 28 clears the L flag and accepts a memory access command. Any command other than Unlock preceding a memory access command causes hands free equipment 20 to remain locked.

The Read Memory command causes DSP 28 to read data from temporary buffer memory 26 at the page number indicated in the forward link [D7–D1] in the case of a sixteen bit POM period. In the case where a page of buffer memory 26 contains sixteen kilobytes of data the Read Memory command results in a read of sixteen kilobytes. After all of the data is read by DSP 28, a success or error response is transmitted by DSP 28 through the reverse link E flag along with the R flag. If DSP 28 is not unlocked before sending this command an error is reported and no read from buffer memory 26 is performed by DSP 28.

The Erase Memory Sector command causes DSP 28 to erase the sector of memory at the page number given in the forward link [D7–D1] transmission. D0 of the forward link can be used to select between half page sectors. When the data is erased within DSP 28 a success or error response is transmitted to programming computer 12 using the reverse link E flag along with the R flag. As previously described, if DSP 28 is not unlocked before sending this command an error is reported and no erasing is performed by DSP 28.

When the Program Memory command is issued DSP 28 writes the contents of temporary buffer memory 26 into DSP memory 36 at the page number given in the forward link [D7–D1]. After all sixteen kilobytes are written according to the Program Memory command, a success or error response is transmitted to programming computer 12 by way of the reverse link E flag along with the R flag. If DSP 28 is not unlocked before sending the Program Memory command an error is reported and no programming is performed by DSP 28.

When the Download Data command is transmitted from programming computer 12 to DSP 28 for the first time, DSP 28 begins reading data from the forward link [D7–D0] of PCM link 24 into buffer memory 26 with the address pointer of buffer memory 26 reset to the beginning of buffer memory 26. The forward link bits [A2–A0] serve as an indicator of the lower three address bits in the current location for the storing of data. DSP 28 transmits the same data and address back to programming computer 12 by way of the reverse link [D7–D0] and [A2–A0]. Programming computer 12 can later transmit the next command to DSP 28 at its own speed. Since [A2–A0] change sequentially, DSP 28 can determine whether errors have occurred by determining that each data item is addressed to the address sequentially following the previous address. Programming computer 12 can wait until it receives the data and address by way of the reverse link before sending the next command. However, this is not necessary. After the downloading, if there is no sequential error, a success flag is sent to programming computer 12 along with the R flag.

During the download process an error is determined if the data bits [D7–D0] change while the address bits [A2–A0] stay the same. If the E flag is set DSP 28 does not change the contents in temporary buffer 26 until data containing different address bits is received. Programming computer 12 can halt processing before all sixteen kilobytes are sent by transmitting a NOP command. This command stops DSP 28 and causes DSP 28 to generate an error message.

When DSP 28 receives the Upload Data command from programming computer 12 it can transmit sixteen kilobytes of data from temporary buffer 26 to programming computer 12 through the reverse link bits [D7–D0] with lower three bits of address [A2–A0]. Each time a data byte is applied to the reverse link DSP 28 waits for programming computer 12 to increment the address bits [A2–A0] on the forward link before advancing to the next byte. If the address bits sent by programming computer 12 are not advanced sequentially, DSP 28 sets the error flag, terminates the command execution process and waits for a NOP from programming computer 12. After all bytes have been transmitted, DSP 28 waits for a NOP and writes a success/error message back to programming computer 12 along with the R flag. Programming computer 12 can terminate the uploading process by transmitting a NOP command before the contents of buffer memory 26 are entirely uploaded by DSP 28. This causes DSP 28 to set the error E flag.

The Upload Memory Device ID command causes DSP 28 to read the device ID of hands free equipment 20 and provide it to programming computer 12. The device ID transmission can contain two bytes of information, the manufacturer ID and the device ID. The E flag and R flag are also transmitted to programming computer 12 along with the device ID. Since data communication protocol within hands free telephone system 10 is specific to the structure of DSP memory 36 programming computer 12 must have this information. Furthermore, programming computer 12 must have access to the current SVN of hands free equipment 20.

When the Upload Program Version command is issued by programming computer 12, DSP 28 transmits the current SVN of the downloaded software present in DSP memory 36 to programming computer 12. The current software version information can contain two bytes. The success/error flag and READY flag are also transmitted to programming computer 12 along with the current version information.

When programming computer 12 transmits the Upload Check Sum command, DSP 28 performs a check sum calculation on buffer memory 26. The result of the check sum calculation is transmitted by DSP 28 to programming computer 12 by way of PCM link 24 as reverse link bits [D7–D0] and address bits [A2–A0]. When the check sum information is transmitted to programming computer the E flag and R flag are transmitted as well.

When no operation is requested by programming computer 12 bits [C4–C0] of PCM link 24 are placed into the NOP state. During regular command execution DSP 28 does not release the READY flag from BUSY until the NOP command appears on the forward link. This guarantees that the same command is not executed twice.

Figure 3:
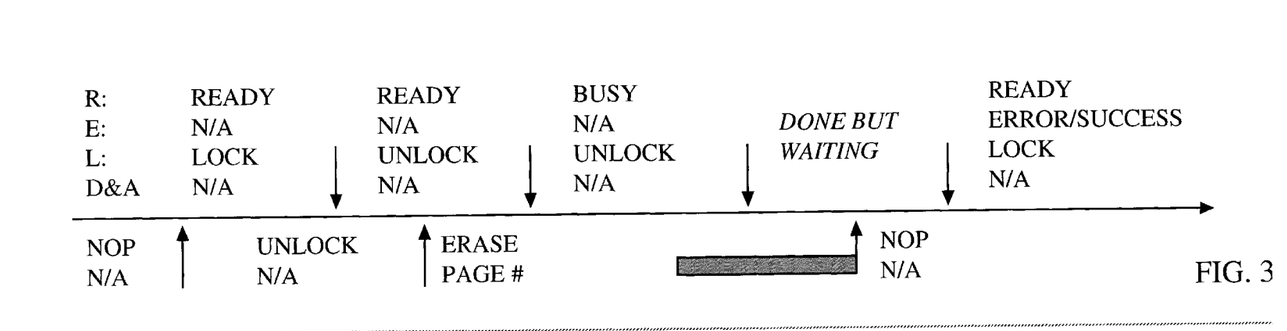
FIGS. 3–5 are timing diagrams illustrating the timing of operations performed by the telephone system of FIG. 1.
Figure 4:
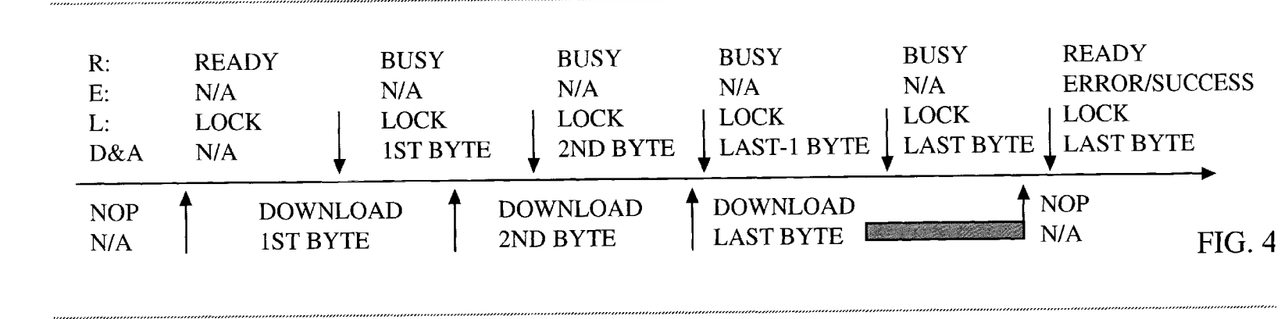
Figure 5:
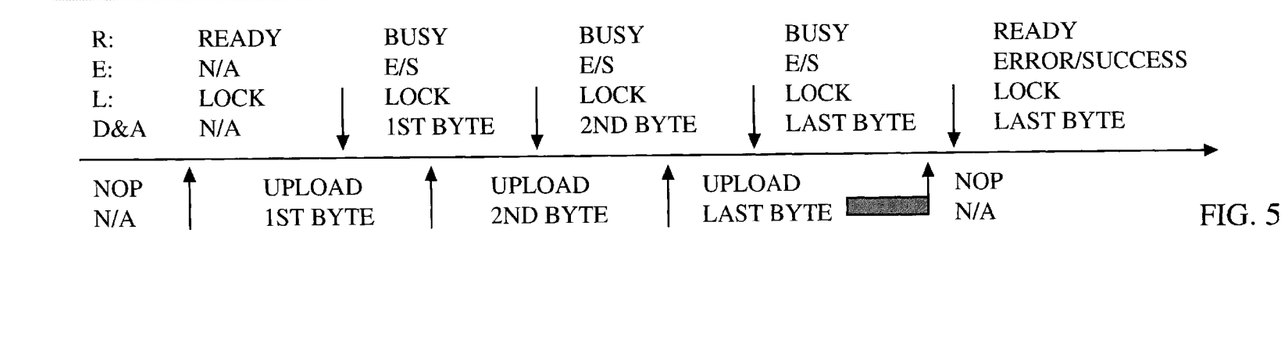

Referring now to FIGS. 3–5, there are shown timing diagrams of communication operations performed by programming computer 12 and DSP 28 during handshaking between programming computer 12 and DSP 28. The operations shown in these timing diagrams include read memory, erase sector and program memory operations.

As shown in FIG. 3, programming computer 12 issues a command when DSP 28 indicates it is READY. Programming computer 12 must send the Unlock Memory command to DSP 28 before issuing requests. DSP 28 transmits the unlock flag and then the busy flag when a set of valid commands is received. It takes varying amounts of time for DSP 28 to execute memory related commands. For example, a typical time for erasing a sector of DSP memory 36 can be 1.5 seconds, 0.5 seconds for programming a page of DSP 28 memory 36, and 0.005 seconds for reading from memory 36. DSP 28 maintains the flag BUSY until a NOP command and the operation is finished. When this is complete, the error/success E flag is transmitted by DSP 28 on the reverse link along with the ready R flag.

As shown in FIG. 4, every download command transmitted by computer 12 begins with a first byte of the address followed by the lower three bits of the address. After DSP 28 transmits the command it sets the BUSY flag and applies the byte and address in the reverse link bits [D7–D0] and [A2–A0]. Programming computer 12 can send the next command without waiting for the reverse link confirmation from DSP 28. DSP 28 eventually transmits all the received bytes and addresses through the reverse link traffic. After all sixteen kilobytes are transmitted, programming computer 12 sends the NOP command as a signal to DSP 28, and DSP 28 sets the ready R flag and reports the success/error message using the E flag.

In the process of receiving sixteen kilobytes, if even one erroneous address is received by DSP 28 the error message is transmitted. The programmer of hands free telephone system can terminate the downloading process by sending the NOP command before the last byte of download data is transmitted. When this occurs DSP 28 terminates the receiving process and reports the error message. This prevents DSP 28 from being trapped in an unknown state when the programmer stops communication with DSP 28. Stopping the PCM clocks for more than 0.1 second puts DSP 28 into the NOP state as well.

As shown in FIG. 5, the Upload Data ID, Device, Version and Check Sum commands work in a similar manner. These commands request DSP 28 to send information back to programming computer 12. The number of bytes varies for these tasks. In one preferred embodiment there can be sixteen kilobytes for the upload buffer command, two bytes for the device ID, two bytes for the version, and three bytes for the check sum. Programming computer 12 uses the address bits [A0–A2] on the forward link PCM stream to control the rate of uploading and is responsible for incrementing the address bits [A2–A0]. DSP 28 is responsible for applying the data to the reverse link data bits [D7–D0] using the address bits to inform programming computer 12 of the correct address index. After all the bytes are sent, DSP 28 waits for a NOP to set the ready R flag. If in the process of sending sequential data, the address bits sent to DSP 28 are not in the ascending order DSP 28 sets the error E flag. Programming computer 12 then terminates the process and waits for the NOP command to restore the ready R flag. Programming computer 12 can terminate the uploading process by sending the NOP command before the uploading process has finished.

Programming computer 12 is responsible for generating the PCM clock for communications sent over the PCM link 24 when operating in the maintenance mode. Additionally, programming computer 12 is responsible for determining whether PCM link 24 between programming computer 12 and DSP 28 is stable. If PCM link 24 between the computer 12 and DSP 28 is broken for more than one-tenth of a second, DSP 28 either terminates or completes the current command depending on what command is issued. For example, in the cases of the Download Buffer and Upload Version, commands DSP 28 can terminate the command. In the case of Erase Sector, DSP 28 can complete the command. DSP 28 then enters a special No Clock state. DSP 28 does not exit the No Clock state unless PCM link 24 is reestablished and a NOP command is received from computer 12. If PCM link 24 is broken for a period less than one-tenth of a second, DSP 28 ignores the incident and proceeds with the next command received from programming computer 12.

The Upload Version command informs programming computer 12 what version of maintenance code DSP 28 is currently running. It also serves as an indicator whether DSP 28 has successfully switched from regular voice modes to the maintenance mode. Programming computer 12 uses the R/E/L flags and the version data in bits [D7–D0] to determine whether DSP 28 has successfully made the mode transition.

Additionally, before performing any code downloading, programming computer 12 determines the memory device ID number by sending the Upload Device ID command to DSP 28. If DSP 28 responds with an error flag, the programming process stops because either the hardware or the memory device is not working properly. If the device ID number is not in the database of programming computer 12 the process must be terminated.

Figure 6:
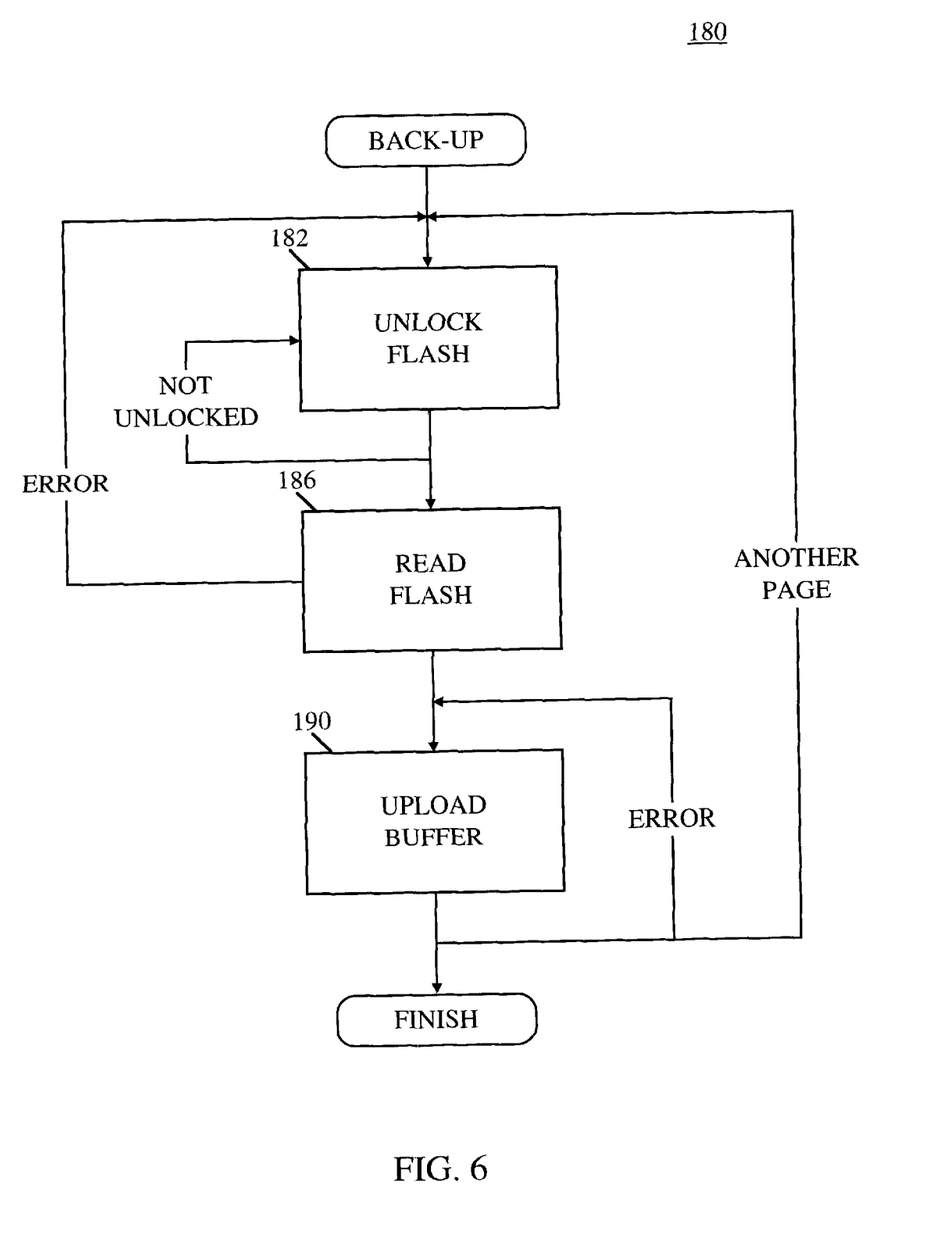
FIG. 6 is a flow chart representation of operations performed within the telephone system of FIG. 1.

Referring now to FIG. 6, there is shown memory backup algorithm 180. Memory backup algorithm 180 can be executed by programming computer 12 to backup the current contents of DSP memory 36. Saving voice recognition template data is one example of this application. DSP memory 36 is unlocked, as shown in block 182. DSP memory 36 can then be read into buffer memory 26 as shown in block 186. Buffer memory 26 can then be uploaded into programming computer 12 as shown in block 190. The upload can be repeated if an error occurs.

Figure 7A:
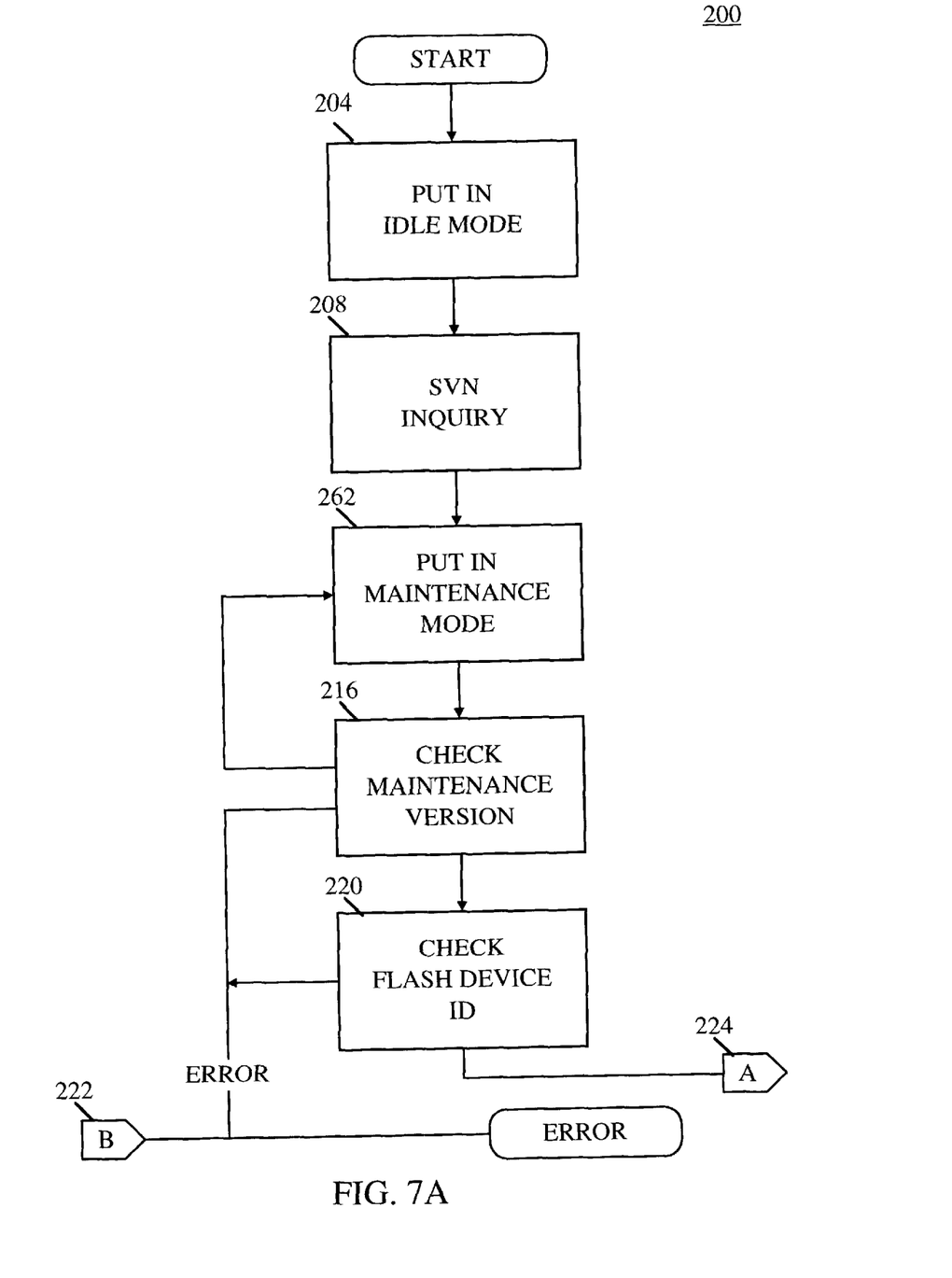
FIGS. 7A, B are flow chart representations of operations performed within the telephone system FIG. 1.
Figure 7B:
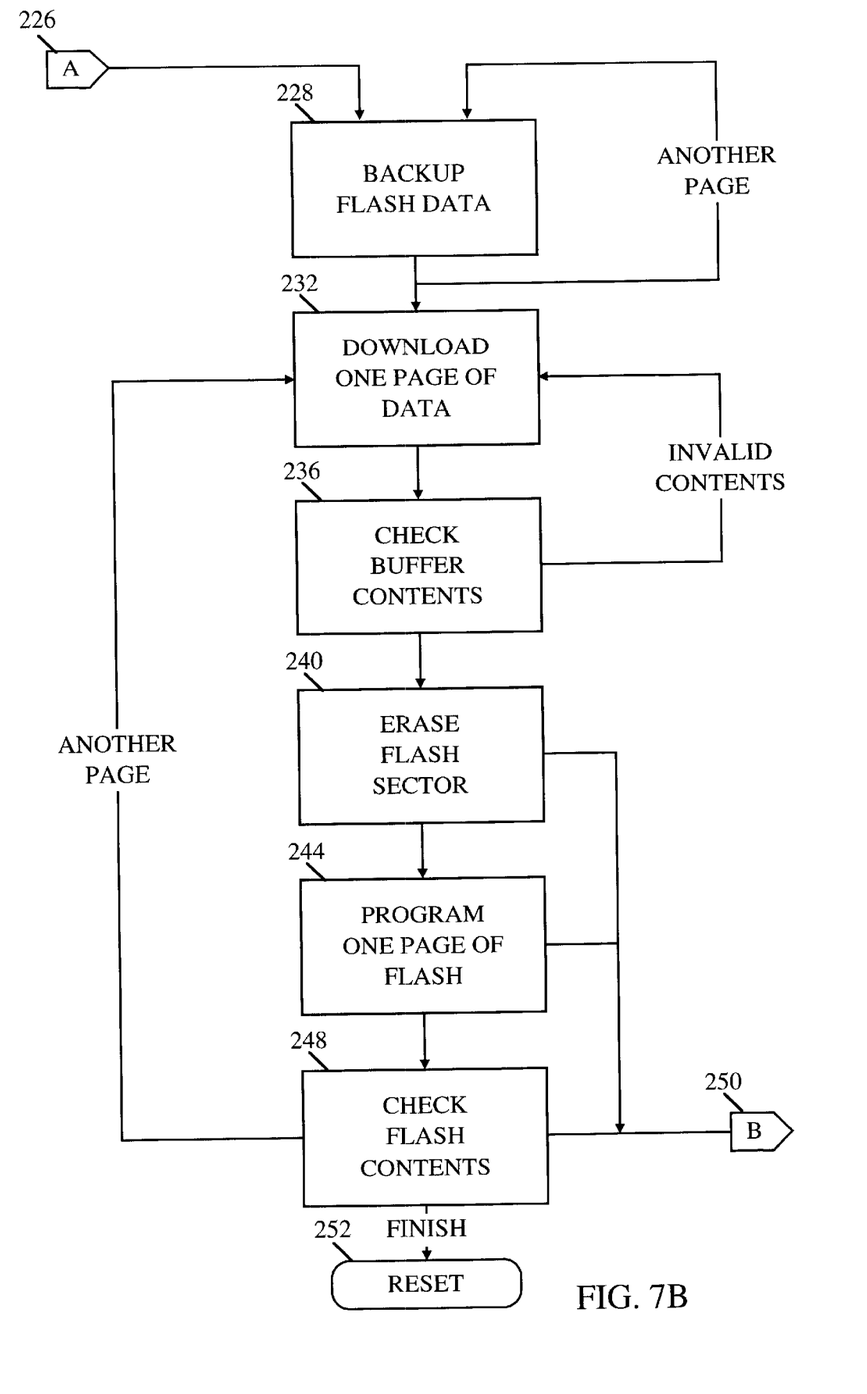

Referring now to FIGS. 7A, B, page programming algorithm 200 is shown. As previously described programming computer 12 must put hands free equipment 20 into the idle mode and determine the SVN. These operations are shown in blocks 204, 208 of programming algorithm 200. Hands free equipment 20 is put into the maintenance mode as shown in block 262 and the maintenance version is checked in block 216. The flash ID is checked in block 220 and the flash memory is backed up in block 228. A page of data is then downloaded to buffer memory 26 and the contents of buffer memory 26 are checked as shown in blocks 232, 236. If the check of the contents does not find any errors the page of flash memory can be erased and programmed as shown in blocks 240, 244. The flash contents are then checked as shown in block 248.

Programming computer 12 uses the Download Buffer command to transmit sixteen kilobytes of data to buffer memory 26. If the E flag is set by DSP 28 during the transmission programming computer 12 determines that the contents of buffer memory 26 are valid. Either the Upload Buffer or the Upload Check Sum command can be used to verify the validity of the contents of buffer memory 26. If the contents are not correct, the programmer can repeat the process until the contents of buffer memory 26 contain all valid data before going on to the next step. Once it is determined that the contents of buffer memory 26 are valid, the Erase Memory command can be sent to erase the page or pages in memory 36 that will be programmed. Once the designated page is erased the Program Memory command can be transmitted to put the buffer contents into the designated page. The programmer can then repeat the process.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In a hands free telephone system having a telephone, a telephone holder for performing telephone operations in accordance with a program in a holder memory within said telephone holder, and a programming device for transmitting said program to said telephone holder, a method for programming said telephone holder, comprising:

transmitting a plurality of programming instructions between said programming device and said telephone holder each programming instruction corresponding to a memory location within said holder memory;

determining whether said transmitted programming instructions correspond to adjacent memory locations within said telephone holder; and determining an error condition in accordance with determination of whether said transmitted programming instructions correspond to adjacent memory locations.

2. The method of claim 1, further comprising: generating an error report if an error condition exists.

3. The method of claim 1, wherein the error report is an error flag.

4. The method of claim 1, further comprising: terminating transmission upon determining an error condition.

5. A computer program stored on a computer-readable medium, comprising:

a first set of instructions operative to transmit a plurality of programming instructions between said programming device and said telephone holder each programming instruction corresponding to a memory location within said holder memory;

a second set of instructions operative to determine whether said transmitted programming instructions correspond to adjacent memory locations within said telephone holder; and a third set of instructions operative to determine an error condition in accordance with determination of whether said transmitted programming instructions correspond to adjacent memory locations.

* * * * *